United States Patent [19]

Hashimoto et al.

[11] Patent Number: 4,714,734
[45] Date of Patent: Dec. 22, 1987

[54] RUBBER COMPOUNDS

[75] Inventors: Takatsugu Hashimoto, Higashiyamato; Akihiro Maehara, Musashimurayama; Seisuke Tomita, Tokorozawa; Yuichi Funahashi; Junichiro Watanabe, both of Ota; Kazuo Sugiura; Hironori Matsumoto, both of Tokyo, all of Japan

[73] Assignees: Bridgestone Corp.; Toshiba Silicone Co., Ltd.; Japan Synthetic Rubber Co., Ltd., all of Tokyo, Japan

[21] Appl. No.: 832,776

[22] Filed: Feb. 25, 1986

[30] Foreign Application Priority Data

Feb. 26, 1985 [JP] Japan .................................. 60-37034
Feb. 26, 1985 [JP] Japan .................................. 60-37035

[51] Int. Cl.$^4$ ................................................ C08K 3/04
[52] U.S. Cl. ...................................... 524/496; 524/506; 524/860; 525/101; 525/104; 525/105; 525/106; 528/43
[58] Field of Search .................. 528/43; 524/496, 506, 524/860; 525/105, 104, 101, 106

[56] References Cited

U.S. PATENT DOCUMENTS 4,021,415 5/1977 Chang ................................... 528/43
4,150,010 4/1979 Itoh et al. ............................ 524/506
4,150,013 4/1979 Punderson ........................... 524/506
4,500,666 2/1985 Wada ................................... 524/506

*Primary Examiner*—Melvyn I. Marquis
*Attorney, Agent, or Firm*—Birch, Stewart, Kolasch & Birch

[57] ABSTRACT

Rubber compounds comprising a specific type of polyorganosiloxane of the following formula

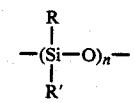

in which R and R' independently represent a hydrocarbon substituent and n is an integer of not smaller than 3 provided that at least 6 mole % of the substituents R and R' consists of a hydrocarbon group having Small's molecular attraction constant not smaller than 350. Carbon black is added to the polyorganosiloxane whereby various physical properties are improved including breaking strength, water and hot water resistances. The rubber compound may further comprise at least one organic rubber other than the above polyorganosiloxane.

21 Claims, 2 Drawing Figures

RUBBER COMPOUNDS

BACKGROUND OF THE INVENTION

1. Field of the Invention

This invention relates to novel rubber compositions or compounds and more particularly, to silicone rubber compounds having good resistance to hot water and good thermal conductivity and processability. The invention also relates to blends of the silicone rubber compounds with other types of rubbers by which the blends have good storage stability and releasability from other organic rubbers before vulcanization and rubber articles obtained therefrom.

2. Description of the Prior Art

In general, silicone rubbers have the feature of good heat resistance and weatherability, but are disadvantageous in that they are inferior in breaking strength, resistance to water and hot water as compared to ordinary organic hydrocarbon rubbers.

Extensive studies have been heretofore made in order to overcome the above disadvantages of silicone rubbers.

For instance, for the improvement of physical strength, attempts have been made to use a reinforcing silica filler having a relatively large surface area of, for example, over 300 $m^2/g$ or to use, as a polyorganosiloxane, a combination of a polyorganosiloxane having vinyl groups in small amounts and a polyorganosiloxane having vinyl groups in large amounts.

In addition, there has been also proposed substitution of part of substituents of organopolysiloxane green rubbers with phenyl groups (in which, in almost all the cases, other substituents are substantially composed of methyl groups, with the proportion of the phenyl group being not larger than 5 mole % of the total substituents).

In order to improve the water and hot water resistance, there is known a method in which reinforcing silica is treated with organosilicon compounds such as polydiorganosiloxanes, organosilanes or organosilazanes on the surfaces thereof. This method is based on the concept that the reason why silicone rubber compounds have poor water and hot water resistances is considered due to the fact that water is adsorbed on the surface of the reinforcing silica filler and the reinforcing effect of silica on polyorganosiloxane is impeded. To avoid this, the silica is covered with hydrophobic groups on the surfaces thereof whereby the water adsorption is prevented.

However, the above methods have the respective drawbacks: although the use of silica fillers having relatively large surface areas and the method using a combination of polyorganosiloxanes having a small amount and a large amount of vinyl bonds may achieve the improvement of physical strength to an extent, they have the drawbacks in poor water and hot water resistances.

The method of introducing phenyl groups into polyorganosiloxanes is also disadvantageous in that since silica is used as the reinforcing agent, so that although the physical strength of the resulting silicone rubber is slightly improved, the elasticity and elongation lower with poor water and hot water resistances.

The method for treating the silica surfaces with organosilicon compounds is very difficult in completely removing the moisture from the silica surfaces. If the moisture is completely removed, the reinforcement is not ensured, so that there cannot be obtained satisfactory effects of remarkably improving the water and hot water resistances of silicone rubber.

On the other hand, it may occur that carbon black is used as a reinforcing agent. However, with known polymers mainly composed of carbon black-added polydimethylsiloxane, typical of which is used as a conductive silicone rubber composition, little affinity between carbon black and the polymers is expected, so that carbon black cannot be dispersed sufficiently and the kneading operation is very difficult. Thus, it takes a very long time for the kneading. In addition, carbon black separates during the course of processing with the vital disadvantage that carbon black is locally concentrated on the surfaces thereof.

As described above, silicone rubbers have good heat resistance, weatherability and releasability, but are inferior in breaking strength, water and hot water resistances to ordinary organic rubbers. Accordingly, extensive studies were heretofore made on rubber compounds or compositions obtained by blending both types of rubbers in order to obtain rubber compounds which have both features of silicone rubber compounds and organic rubbers.

Hitherto known rubber blends of organic rubbers and silicone rubbers include mere blend or mixture of both types of rubbers (as is disclosed, for example, in Japanese Laid-open Patent Application Nos. 54-41957, 55-139604 and 56-76444), and rubber compounds in which polyorganosiloxanes are bonded with C═C double bonds of organic rubbers (as disclosed, for example, in Japanese Laid-open Patent Application Nos. 54-157149, 55-15497, 55-31817, 56-76440 and 56-76441).

However, because of the absence of affinity of polyorganosiloxanes for organic rubbers, organic rubbers and polyorganosiloxanes are very liable to separate. Therefore, mere blends are disadvantageous in that they are extremely poor in storage stability under unvulcanized conditions, giving an adverse influence on the quality and characteristics of final product and thus the supervision of the blends is very difficult.

The rubber compounds obtained by bonding polyorganosiloxanes to C═C double bonds of organic rubbers are not satisfactory with regard to the releasability from organic rubbers.

All the known methods or rubber compounds which use reinforcing silica fillers have the vital drawback that the reinforcing ability of silica deteriorates by the action of water or hot water, which is attributed to the moisture adsorption of silica.

As will be appreciated from the foregoing, the known rubber compounds obtained by mixing organic rubbers and polyorganosiloxanes have the features of the respective types of rubbers to an extent, but have the respective serious drawbacks and have not been unsatisfactory for practical applications. Accordingly, there is a demand of rubber compounds which overcome the above drawbacks and have high utility.

SUMMARY OF THE INVENTION

An object of the present invention is to provide silicone rubber compounds which have good strength and water and hot water resistances as well as good thermal conductivity and processability.

Another object of the invention is to provide blends of the silicone rubber compounds and other organic rubbers whereby the blends have not only good strength, water and hot water resistances and heat resistance, but also good storage stability in an unvulcanized condition and good releasability from organic rubbers.

A further object of the invention is to provide rubber articles obtained from the rubber compound or blend mentioned above.

According to the present invention, the above objects can be achieved by a silicone rubber compound which comprises a polyorganosiloxane of the following formula in which R and R' are independently a hydrocarbon substituent, and n is an integer of 3 or over, provided that not less than 6 mole % of the substituents R and R' is a hydrocarbon substituent which has the Small molecular attraction constant of not smaller than 350, and a carbon black reinforcing agent.

The inventors made extensive studies on various combinations of primary structures of polyorganosiloxanes and reinforcing agents in order to obtain silicone rubber compounds which have improved water and hot water resistances and high strength. As a result, it was found that when a specific type of polyorganosiloxane as indicated above was used, carbon black, which was considered not to give a good reinforcing effect when used in combination with polyorganosiloxanes, could be kneaded as well dispersed. In addition, the resultant rubber compound is reinforced with carbon black by interaction therebetween.

The polyorganosiloxane having the specific type of substituent according to the invention can improve the dispersability of carbon black. Thus, there can be obtained a carbon black-reinforced silicone rubber compound which has very good characteristics. Because of the reinforcement with carbon black, the resulting rubber has very high strength and good heat, water and hot water resistances.

The polyorganosiloxanes of the invention have good affinity for carbon black, so that desired rubber compounds can be readily obtained by a kneading operation within a short time. Separation of carbon black does rarely occur with very excellent processability.

In addition to those good characteristics, the rubber compound according to the present invention has high thermal conductivity and exhibits a heat emittivity higher by two times or over than ordinary silica-reinforced silicone rubber compounds. Thus, the silicone rubber compound of the invention has high utility as various rubber articles.

According to another embodiment of the invention, there is also provided a rubber composition in which organic rubbers are added the above silicone rubber compound.

The specific type of polyorganosiloxane of the invention has the strong interaction with carbon black which is used as a good reinforcing agent for ordinary organic rubbers and can remarkably improve the dispersability of the carbon black particles. As a matter of course, carbon black has high affinity for organic rubbers as well as the polyorganosiloxanes. The rubber blends of the polyorganosiloxane and organic rubbers can be thus stably obtained with good characteristics of the respective rubbers.

The rubber blend of the invention has much improved storage stability and can overcome the problems of lowering water and hot water resistances as conventionally involved in the reinforcement with silica. In addition, the rubber blend has high heat resistance, weatherability and strength and has thus wide utility.

BRIEF DESCRIPTION OF THE DRAWINGS

The above and other objects, features and advantages of the invention will become more apparent from the following description and claims taken in connection with the accompanying drawings, in which:

DETAILED DESCRIPTION OF THE INVENTION

The rubber compound of the invention should comprise a polyorganosiloxane of recurring units of the following general formula:

in which R and R' independently represent a hydrocarbon substituent and may thus be the same or different, and n is an integer of not smaller than 3. In the polyorganosiloxane, at least not less than 6 mole % of the substituents R and R' should be a hydrocarbon substituent having the Small molecular attraction constant not smaller than 350.

The term "Small's molecular attraction constant" is intended to mean the constant defined by P. A. Small and described in "Journal of Applied Chemistry", Vol. 3, pp. 71–80 (1953). The polyorganosiloxanes used in the practice of the invention should have a hydrocarbon substituent having a Small's molecular attraction constant of not smaller than 350, preferably not smaller than 500, more preferably not smaller than 700, in an amount of not less than 6 mole % of the substituents R and R', preferably 10 to 70 mole %, more preferably 15 to 60 mole %, and most preferably 20 to 50 mole % of the substituents.

The substituents having the Small's molecular attraction constant not smaller than 350 include, for example, aromatic groups or derivatives thereof, or organic groups having at least one aromatic group or aromatic derivative in the structure thereof such as phenyl, m-methylphenyl, p-methylphenyl, p-ethylphenyl, p-isopropylphenyl, m-sec-butylphenyl, m-tert-butylphenyl, p-sec-butylphenyl, p-tert-butylphenyl, m-phenylphenyl, p-phenylphenyl, p-benzylphenyl, beta-naphthyl, alpha-naphthyl, 2,4-dimethylphenyl, 2,5-dimethylphenyl, 3,4-dimethylphenyl, 3,5-dimethylphenyl, o-methoxyphenyl, m-methoxyphenyl, p-methoxyphenyl, m-phenoxyphenyl, p-phenoxyphenyl, 4-methoxy-3-methylphenyl, 6-methoxy-3-methylphenyl, 3,4-dimethoxyphenyl, 2-methyl-4-methoxy-5-isopropylphenyl, phenoxymethyl, o-fluorophenol, m-fluorophenyl, p-fluorophenyl, o-chlorophenyl, p-chlorophenyl, 2,3-dichlorophenyl, 2,4-dichlorophenyl, 2,5-dichlorophenyl, 2,6-dichlorophenyl, 3,4-dichlorophenyl, 3,5-dichlorophenyl, 2,3,4-trichlorophenyl, 2,3,5-trichlorophenyl, 2,3,6-trichlorophenyl, 2,4,5-trichlorophenyl, 2,3,4,5-tetrachlorophenyl, 2,3,4,6-tetrachlorophenyl, 2,3,5,6-tetrachlorophenyl, pentachlorophenyl, o-bromophenyl, m-bromophenyl, p-bromophenyl, p-cyanophenyl, p-aminophenyl, p-hydroxyphenyl, m-cyanophenyl, m-aminophenyl, 2-phenylethyl, 2-phenylpropyl, acenaphthyl, indolyl, anthrasyl, phenanthryl and the like; heterocyclic groups or derivatives thereof, or organic groups having at least one heterocyclic group or derivative thereof in the structure such as furyl, furfuryl, 1-pyridyl, 2-pyridyl, 3-pyridyl, pyridazyl, pyradyl, quinolyl, isoquinolyl, triazinyl, triazoyl, thiophenyl, oxazyl and the like; organic acid groups, organic acid ester groups, organic acid derivatives including derivatives containing carboxyl groups and/or amido groups, and organic groups containing at least one of these groups in the structure thereof such as 2-hydroxycarbonyl ethyl, 2-hydroxycarbonyl propyl, 1-methyl-2-hydroxycarbonyl ethyl, dimethylhydroxycarbonyl ethyl, 2-methoxycarbonyl ethyl, 2-ethoxycarbonyl ethyl, 2-methoxycarbonyl propyl, 1-methyl-2-methoxycarbonyl ethyl, 1-methyl-2-ethoxycarbonyl ethyl, dimethylmethoxycarbonyl methyl, dimethylethoxycarbonyl methyl, 2-dihydroaminocarbonyl ethyl, 2-dimethylaminocarbonyl ethyl, 2-diethylaminocarbonyl ethyl, 2-dimethylaminocarbonyl propyl, 2-diethylaminocarbonyl propyl, 1-methyl-2-dimethylaminocarbonyl ethyl, 1-methyl-2-diethylaminocarbonyl ethyl, dimethyl(dimethylaminocarbonyl)methyl, dimethyl(diethylaminocarbonyl)methyl and the like; organic groups having at least one C=C double bond in the molecule thereof such as poly-1-butynylene, polyvinyl ethylene, poly-1-methyl-1-butynylene, higher unsaturated acid residues and the like; and higher fatty acid residues, long-chain alkyl groups, polyoxyalkylene group and the like. However, the substituents are not limited to those indicated above.

Of these, organic groups having an aromatic ring in the molecular structure thereof and particularly, organic groups having a benzene ring are preferred.

In the practice of the invention, at least 6 mole % or more of the substituents R and R' should be a substituent having the Small molecular attraction constant of not smaller than 350 and the other substituents are not critically limited. Examples of the other substituents may be alkyl groups such as methyl group, ethyl group, propyl group, butyl group, pentyl group, hexyl group, octyl group, decyl group and the like, and halogenated alkyl groups such as chloromethyl group. Because of the ease in synthesis and the impartment of high heat resistance and weatherability to silicone rubber, methyl group is most preferred.

The degree of polymerization of the polyorganosiloxane or n in the general formula is generally in the range of 15 to 3000, preferably over 50 and less than 2000 and most preferably over 100 and less than 2000 when the polyorganosiloxane is applied as a liquid rubber compound. Upon application as a millable-type silicone rubber compound, the degree of polymerization is over 2000, preferably over 3000 and most preferably 4000 to 10000.

The polyorganosiloxane according to the invention should preferably be substantially linear but may have a partially branched or network structure.

In the rubber compound of the invention, organic rubbers may be added to the polyorganosiloxane. Examples of the organic rubbers include natural rubber, isoprene rubber, styrene-butadiene rubber, butadiene rubber, ethylen-alpha-olefin rubbers, acrylonitrile-butadiene rubber, butyl rubber, halogenated butyl rubber, fluoro rubbers, acrylic rubber, epichlorohydrin rubber, ethylene-vinyl acetate copolymers, ethylene-acrylate rubber and the like.

From the standpoint of the uniform dispersability and kneading workability with the polyorganosiloxane, the Mooney viscosity of the organic rubber is generally in the range of from 20 to 150, preferably from 30 to 100 and most preferably from 40 to 80. This viscosity range will result in a rubber compound or blend having a stable quality and characteristics. Outside the above range, the kneading workability and dispersability become poor, making it difficult to maintain the quality and characteristics.

The compositional weight ratio of the polyorganosiloxane and the organic rubber is generally in the range of 95:5 to 5:95, preferably 80:20 to 20:80. If the rubber blend is required to have hot water resistance, the ratio is in the range of 50:50 to 30:70.

In order to obtain satisfactory physical properties, the polyorganosiloxane or its blend with organic rubber is generally crosslinked to form a network structure. For this purpose, vulcanizing agents are added to the compound or blend, followed by readily curing by vulcanization or covulcanization. Examples of the vulcanizing agents include a diversity of vulcanizing agent such as organic peroxides, sulfur, sulfur compounds, alkylphenol resins, quinoid compounds and the like, of which sulfur and sulfur compounds are preferred.

The manner of vulcanization of the rubber compound or blend is described in more detail.

The crosslinkage may be effected by the following methods including (a) a method using organic peroxide, (b) a method using sulfur and a sulfur compounds, (c) a method using a resin crosslinking agent or a crosslinking agent used for organic diene rubbers, (d) a method using UV rays or electron beams, (e) a method using a hydrolytic condensation reaction between silanol groups (Si—OH) and a crosslinking agent, (f) a method using an addition reaction between hydrosilyl groups (Si—H) and vinyl groups bonded to the silicon atoms, and (g) a method using the ring opening of epoxy groups. These methods may be used singly or in combination. The crosslinking method is used to fundamentally make a crosslinking structure and should not be construed as limiting to those methods (a) through (g).

Where the method (a), (b) and/or (c) is adopted, the substituents R and R' should have structures having at least one C=C double bond (which may be referred simply as "crosslinkable substituent") in an amount of 0.02 to 10 mole % (provided that if acylperoxides such as benzoyl peroxide is used in the method (a), the amount ranges from 0 to 10 mole %), and preferably in an amount of 0.05 to 5 mole %. Especially, when the crosslinking method (b) or (c) is used, the crosslinkable substituent is preferred to be a substituent which has a C=C double bond through at least one carbon from the silicon atom of siloxane. When the method (b) or (c) is adopted, the crosslinkable substituent should preferably have not smaller than 5 carbon atoms.

The crosslinkable substituents should have a structure having at least one C=C aliphatic double bond and include, for example, alkenyl groups such as vinyl group, allyl group and the like, alkylidenenorbolnyl groups such as ethylidenenorbolnyl group, methylenenorbolnyl group and the like, dicyclopentenyl group, 4-pentenyl group, 4-hexenyl group, cycloocetenyl group, and the like. However, the crosslinkable substituents are not limited to those indicated above.

The organic peroxides used for crosslinkage by the method (a) include, for example, methyl ethyl ketone peroxide, cyclohexanone peroxide, 3,3,4-trimethylcyclohexanone peroxide, methylcyclohexanone peroxide, methylacetoacetate peroxide, acetylacetone peroxide, 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy)valerate, 2,2-bis(t-butylperoxy)butane, t-butyl hydroperoxide, cumene hydroperoxide, diisopropylbenzene hydroperoxide, p-methane hydroperoxide, dicumyl peroxide, 2,5-dimethylhexane-2,5-dihydroperoxide, 1,1,3,3-tetramethylbutyl hydroperoxide, di-t-butyl peroxide, t-butylcumyl peroxide, α,α'-bis(t-butylperoxy-m-isopropy)benzene, 2,5-dimethyl-2,5-di(t-butylperoxy)hexane, 2,5-dimethyl-2,5-di(t-butylperoxy)hexine-3, acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, p-chlorobenzoyl peroxide, 2,4-dichlorobenzoyl peroxide, m-tolyoyl peroxide, diisopropyl peroxydicarbonate, di-2-ethylhexyl peroxycarbonate, di-n-propyl peroxycarbonate, dimyristyl peroxydicarbonate, diallyl peroxydicarbonate, di-2-ethoxyethyl peroxydicarbonate, dimethoxyisopropyl peroxycarbonate, di-(3-methyl-3-methoxybutyl)peroxycarbonate, t-butyl peroxyacetate, t-butyl peroxyisobutylate, t-butyl peroxypivalate, t-butyl peroxyneodecanoate, cumyl peroxyneodecanoate, t-butyl peroxy-2-ethyloctanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleic acid, t-butyl peroxyisopropylcarbonate, cumyl peroxyoctanoate, t-hexyl peroxypivalate, t-butyl peroxyneohexanoate, t-hexyl peroxyneohexanoate, acetylcyclosulfonyl peroxide, t-butyl peroxyallylcarbonate and the like, but are not limited to those compounds. Among them, organic peroxides except hydroperoxides are preferable because of physical property of the cured rubber. From the viewpoint of stability and workability, it is most preferred to use benzoyl peroxides, 2,4-dichlorobenzoyl peroxide, dicumyl peroxide, di-t-butyl peroxide, p-chlorobenzoyl peroxide, 2,5-dimethyl-2,5di-(t-butylperoxy)hexane, and t-butylcumyl peroxide. In order to improve the workability, silicone fluids or inorganic fillers may be used for dilution.

If the method (b) is used for crosslinkage, sulfur and sulfur compounds are used as crosslinking agents. Examples of the sulfur compounds include thiuram compounds such as dipentamethylene thiuram tetrasulfide, tetramethyl thiuram disulfide, tetraethyl thiuram disulfide, tetrabutyl thiuram disulfide and the like, thiazole compounds such as 2-(4-morpholinodithio)benzothiazole, 4,4'-dithiodimorpholine, N,N'-4-thiobis(hexahydro-2H-azepinone-2), alkylphenol disulfides, polysulfides, and the like. When these crosslinking agents are used, all known vulcanization promoters and accelerators which are ordinarily used for vulcanization with sulfur and sulfur compounds for ordinary organic rubbers, may be used.

Examples of the crosslinking agents used in the method (c) include oxime and nitroso compounds such as p-quinone oxime, p',p'-dibenzoylquinone oxime, polynitrosobenzene, N-(2-methyl-2-nitropropyl)-4-nitrosoaniline and the like, resin vulcanizers such as alkylphenol-formaldehyde resins, thermally reactive phenolic resins, melamine-formaldehyde condensates, triazine-formaldehyde condensates, halogenated alkyl phenol-formaldehyde resins and the like, and polyamines, polyols, metal oxides and the like. In case where these vulcanizers are used, a wide variety of known vulcanization promotors and promotor aids which are used on vulcanization of ordinary organic rubbers may be used.

The crosslinking mechanism in the method (d) will be shown according to the following formula.

Utilization of a radical reaction similar to millable-type silicone rubbers:

Utilization of hydrosilylation reaction:

Photocuring after introduction of acrylic groups into silicones:

Crosslinking by decomposing onium salts to produce strong acid and ring-opening epoxy bonds:

When the crosslinking is effected by the method (d), all known initiators and sensitizers which are used for ordinary UV and electron beam crosslinking, may be used.

The crosslinking agent used in the method (e) is at least one compound selected from hydrosilyl group-containing siloxanes, silanol group-containing siloxanes, alkoxysilanes, acetoxysilanes, oximesilanes, enoxy silanes, aminosilanes, amidosilanes, aminoxy group-containing silanes and the like. When these crosslinking agents are used, all heavy metal salts and amines which are known ordinarily as catalysts may be used. In this crosslinking method, as the substituents R, R' silanol groups should be contained in an amount of 0.01 to 30 mole %, preferably from 0.05 to 10 mole %.

When the method (f) is used for crosslinkage, the polyorganosiloxane used as the base polymer may be linear, branched or in mixed form. As the substituents (R) vinyl groups should be contained in amounts of 0.02 to 10 mole %, preferably 0.05 to 10 mole %. Amounts less than 0.02 mole % are disadvantageous in that a crosslinking density sufficient for satisfactory mechanical properties cannot be obtained. On the other hand, when the amount exceeds 10 mole %, satisfactory rubber elasticity cannot be obtained with a lowering of heat resistance.

Polysiloxanes having 3 or more hydrosilyl groups in one molecule, i.e. linear, branched and/or cyclic polyorganohydrogensiloxanes, may be used as the crosslinking agent. Organic groups bonded to the silicon atoms of the polysiloxanes include, for example, alkyl groups such as methyl, ethyl, propyl, butyl, pentyl, hexyl, octyl, decyl and the like, aryl groups such as phenyl, and aralkyl groups such as 2-phenylethyl, 2-phenylpropyl and the like. In view of the ease in synthesis, methyl group is preferred, but any organic group may be introduced from the standpoint of compatibility with the base polymer. The amount of the crosslinking agent is determined such that the hydrosilyl groups contained in the agent are in the range of 0.5 to 5.0, preferably from 1.0 to 3.0, per vinyl group of the base polymer. Outside the above range of 0.5 or 5.0, the crosslinkage cannot proceed satisfactorily, so that the mechanical properties and heat resistance will lower.

The catalysts may be elemental platinum, and platinum compounds such as chloroplatinic acid, platinum-alcohol complexes, platinum-olefin complexes, platinum-vinyl siloxane complexes, platinum-phosphorus complexes and the like. The amount of the catalyst is in the range of 1 to 100 ppm as platinum metal on the weight basis to the base polymer. Amounts less than 1 ppm are disadvantageous in that satisfactory curing cannot be obtained, whereas the curing speed cannot be further improved in excess of 100 ppm.

When the method (g) is used for crosslinkage, as the substituents R, R' of a polyorganosiloxane, a group containing at least one epoxy ring therein should be used in an amount of 0.01 to 10 mole %, preferably 0.05 to 1 mole %. The crosslinking agent used in this method may be any polymerization catalysts for epoxy compounds, but strongly basic or acidic agents are not suitable.

Part of the polyorganosiloxane used in the present invention may be replaced by other type of polyorganosiloxane, e.g. polydimethylsiloxane, within a range not impeding the effect of the invention. In this case, another polyorganosiloxane is used in the range of not larger than 100 parts by weight, preferably not larger than 50 parts by weight, per 100 parts by weight of the polyorganosiloxane of the invention.

Reinforcing carbon black used in the rubber compound of the invention has generally an average particle size of not larger than 1000 angstrom, preferably not larger than 600 angstrom, on measurement through an electron microscope. The average size over 1000 angstrom does not show a satisfactory reinforcing effect. Carbon black having an average particle size not larger than 1000 angstrom is, for example, SRF, GPF, HMF, ACEF, FF, FEF, HAF, ISAF, SAF, EPC, MPC, HPC, CC, GERMAN, CF, SCF, XCF, Acetylene Black, Ketjen Black and the like.

It will be noted that conductive carbon black is slightly disadvantageous in reinforcement over ordinary carbon blacks.

The amount of carbon black is generally in the range of 2 to 200 parts by weight, preferably from 5 to 130 parts by weight and most preferably from 20 to 100 parts by weight, per 100 parts by weight of the total of polyorganosiloxane and organic rubber. If the amounts of carbon black are less than 2 parts by weight or over 200 parts by weight per 100 parts by weight of the total of polyorganosiloxane and organic rubber, the resultant rubber compound or blend has not good physical properties. Especially, when the amount exceeds 200 parts by weight, there is a high tendency that the workability becomes very poor.

The rubber compound of the invention may further comprise, if necessary, reinforcing or non-reinforcing fillers other than carbon black. Examples of the fillers include powders or fibers of inorganic compounds such as fumed silica, precipitated silica, silica aerosol, powdered quartz, ground whiting, light calcium carbonate, whiting, chalk, magnesium-containing specific calcium carbonate, surface treated calcium carbonate, magnesium carbonate, magnesite, kaoline groups, kaolinite, nacrite, hallocite, hydrous halloycite, allophane, pyrophyllite, talc, montmorillonite, beidellite, hectorite, saponite, nontronite, sericite, illite, muscovite, phlogopite, biotite, amesite, chamosite, hard clay, soft clay, kaolin clay, calcined clay, diatomaceous earth, gibbsite, beyerite, boehmite, diaspore, gamma-alumina, alpha-alumina, barium carbonate, strontium carbonate, bentonite, zinc oxide, zinc carbonate, activated clay, aluminium hydroxide, titanium oxide, ferrite, asbestos, glass powder, aluminium silicate, red iron oxide, hydrotalcite, magnesium hydroxide, activated zinc powder, silicon carbide, silicon nitride, zirconium titanate, zironium oxide and the like; and organic compounds such as phenolic resins, coumarone resins, styrene resin, high styrene-containing styrene-butadiene resins, nylons, aramid resins and the like. These fillers may be treated on the surfaces thereof with organic silicone compounds or polydiorganosiloxanes to render them hydrophobic.

Other known heat-resistance improvers, thermal conductivity-imparting agents, electrical conductivity-imparting agents, vulcanization aids, processing aids and the like may be further added to the compound or blend.

The rubber compound according to the invention has such good characteristics as high resistances to water and hot water, high physical strength and thermal conductivity, so that it is very useful as a material for rubber articles in various fields of industry such as rolls, conveyor belts, gaskets, shielding gaskets, inflammable rubber parts, electric wires, heat-emitting sheets, hoses, tubes, O-rings, oil-seals, cushion sheets, tires, molding members for rubber articles, vibration damping rubbers, rubber screens, fenders and the like.

The polyorganosiloxane used in the compound of the invention has very good affinity for carbon black. Accordingly, at the time of preparing silicone rubber compositions to which carbon black is added, e.g. conductive rubbers, the polyorganosiloxane can be used for a carbon black master batch which has been much improved in kneadability. In other words, the rubber compound of the invention can be used as a silicone/carbon master batch.

The rubber compound or blend of the invention in which the specific type of polyorganosiloxane, with or without being mixed with organic rubber, is reinforced with carbon black, can be effectively used for the manufacture of bladders for vulcanization.

This is described in more detail. Pneumatic rubber tires for vehicles are generally produced by molding a green tire by a molding press and curing the green. In the molding press, the green tire is pressed outwardly relative to the mold surface by means of an internal fluid expansible bladder. In this manner, the green tire is molded and vulcanized corresponding to an external mold surface which determines a tread pattern and the construction of side walls.

A known composition of a vulcanization bladder which is used for the molding and vulcanization of such a rubber tire as described above is composed of an organic rubber, particularly butyl rubber. However, the vulcanization bladder composed of an organic rubber has poor releasability from the inner surface of the tire, with the tendency that the bladder is bent on removal of the tire. Thus, the molding of the tire in the mold results in failure. In addition, the bladder surface is worn and becomes rough, so that there is the possibility that the bladder surface adheres to the inner surface of the tire after the curing of the tire and during the course of shrinkage of the bladder in the tire curing cycle. Moreover, bubbles are confined between the bladder and the tire surface, impeding the normal heat transfer and thus promoting the vulcanization defects of the tire.

To avoid this, it is the usual practice that in the known vulcanization bladder, a releasing agent comprising a silicone emulsion is used to ensure ready release from the inner surface of the tire. However, application of a releasing agent on the inner surface of tire not only involves disadvantages such as an increase in number of the manufacturing step and an intermediate stock build-up, but also is disadvantageous in that the releasing agent frequently gives an adverse influence on the molding and vulcanization of tire, causing occurrence of rejected products.

In order to solve the above problem, attempts were made in that the organic rubber surface of the vulcanization bladder was modified with silicones. In fact, there have been proposed use of hydroxy group-containing polydimethylsiloxane (Japanese Laid-open Patent Application Nos. 57-111393 and 57-119992), use of the aforesaid polydimethylsiloxane and use of polysiloxane containing methylhydrogensiloxy or dimethylhydrogensiloxy units (Japanese Laid-open Patent Application No. 57-111394).

Although the above method of the surface modification of organic rubbers with silicones could improve the releasability between the bladder surface and the inner surface of the tire and the tire can be molded and vulcanized without use of any releasing agent, there arised a problem that the bladder surface became very poor in durability and thus this method was not practical. Accordingly, there is a demand of a bladder for vulcanization which has not only good physical properties such as mechanical strength and heat and hot water resistances, but also high releasability with high practical utility.

The rubber compound or blend of the present invention can satisfy the above demand. In fact, the bladder for vulcanization formed from the rubber compound of the invention has good releasability and very good physical properties such as mechanical strength, heat resistance, hot water resistance and durability.

When the molding and vulcanization of rubber articles and particularly, tires is effected using a bladder for vulcanization which is formed from the rubber compound of the invention, the following advantages result.

(1) Molding and vulcanization of rubber articles are possible without use of any releasing agent.

(2) Accordingly, few defective moldings are produced with a remarkably improved yield.

(3) The life of the vulcanization bladder is long.

Rubber products can thus be molded and vulcanized at a low cost and in a high efficiency.

When organic rubbers are blended with polyorganosiloxanes of the type used in the present invention in order to make a bladder for vulcanization, the organic rubbers may be those indicated hereinbefore. Preferably, butyl rubber, halogenated butyl rubbers, acrylic rubbers and EPDM are used. Where rubber products are molded and vulcanized using the vulcanization bladder, a compound or composition to be molded is placed in a molding machine in which a vulcanization bladder formed by curing and molding a rubber compound of the invention by means of a vulcanizing agent is mounted, and compressed under heating conditions. Other manufacturing conditions may be those ordinarily used for these purposes.

Moreover, the rubber compound of the invention may be conveniently used for making pneumatic tires. The compound of the invention can give a good appearance of a tire especially at the tire sides ranging from the upper portions of beads through side walls to the lower portions of shoulders. The resultant pneumatic tire has good ozone resistance, weatherability and heat resistance.

In recent years, with pneumatic tires particularly for automotive vehicles, great importance is placed on the appearance as well as on the controllability, high speed durability and comfortability. When the tire has a poor appearance even though having good performances, the commercial value tends to lower.

Figure 1:
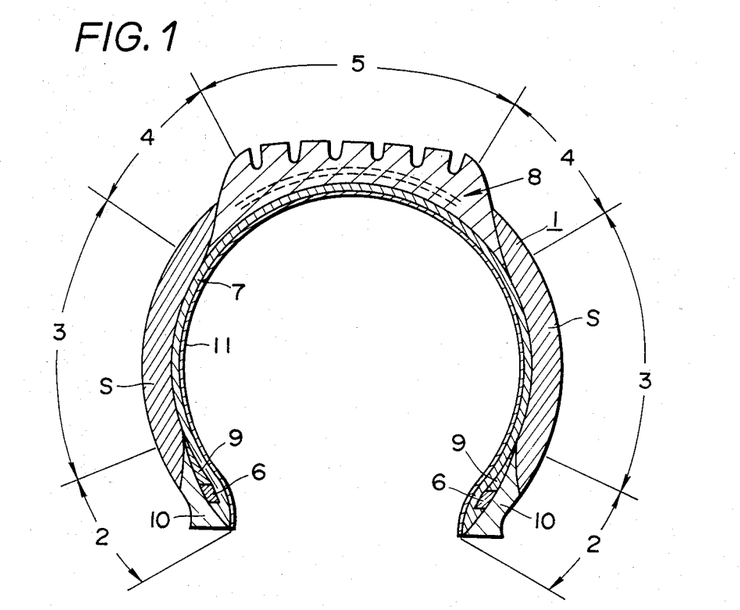
FIG. 1 is a sectional view of a tire for automotive vehicles using a rubber compound of the invention.

In general, automotive tires are constructed as sectionally shown in FIG. 1. The tire has a pair of beads 2 connected through a pair of side walls 3 to shoulders 4 to form tire sides S. In order to improve the weatherability, ozone and heat resistances of the tire sides S each covering from the upper portion of the bead 2 through the side wall 3 to the lower portion of the shoulder 4, there is used a rubber compound which comprises large amounts of waxes and antioxidants. The wax serves to form a thin layer on the rubber surface by blooming, so that the rubber surface is protected from the attack of ozone in air to prevent occurrence of cracks. The antioxidant prevents occurrence of cracks caused by bending during travelling.

However, the waxes or antioxidants compounded in the rubber compound are allowed to settle out on the surface of the tire side as time passes, thus causing the appearance of the tire to be considerably worsened.

Accordingly, there is a high demand of tires which can maintain good tire characteristics without impeding the appearance thereof.

The rubber compound of the invention can meet the above demand.

More specifically, a pneumatic tire of the type which comprises a pair of beads, a pair of side walls extending from the pair of beads, and a tread connected through shoulders to the paired side walls is formed from the rubber compound of the invention with respect to at least an external layer of each tire side including the bead through the side wall to the shoulder. By this, the resultant pneumatic tire has the tire sides with a good appearance while maintaining high ozone and heat resistances and weatherability. The rubber composition of the invention which comprises a specific type of polyorganosiloxane with or without organic rubbers, and carbon black can yield a pneumatic tire whose tire sides have very excellent physical properties such as mechanical strength, heat resistance, ozone resistance, weatherability, flex cracking resistance, defect proofing and the like.

It is not necessary, therefore, to add waxes or antioxidants to a rubber compound used to form the tire sides, thus being free of any problem that the appearance of the tire becomes poor by settling-out of these additives. Thus, a very good appearance of the tire can be maintained over a long term with an improved commercial value.

Reference is now made to the accompanying drawings to more particularly describe an application of a rubber compound as a pneumatic tire though such a tire has been briefly described hereinbefore.

In the figures, the rubber compound of the invention is applied as an automotive radial tire, which should not be construed as limiting the present invention.

Figure 2:
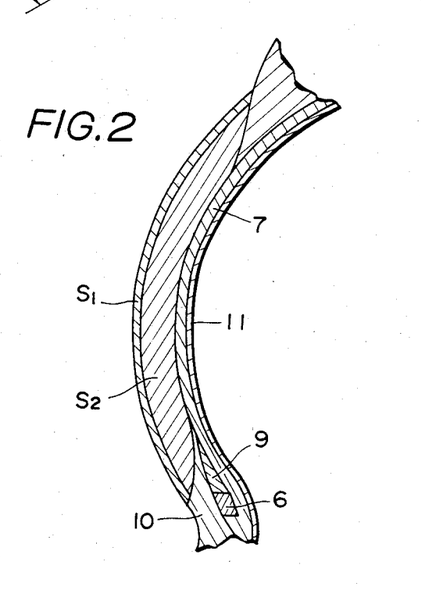
FIG. 2 is an enlarged, sectional view of a tire side portion according to another embodiment of the invention.

Once again, FIG. 1 shows a section of an automotive radial tire according to one embodiment of the invention and FIG. 2 shows a tire side, partially in section, according to another embodiment of the invention.

As shown in FIG. 1, an automotive radial tire 1 has a pair of beads 2, a pair of side walls 3 extending from the respective beads 2, and a tread 5 connected through shoulders 4 to the side walls 3. The respective beads 2 have bead wires 6 between which a carcass 7 composed of a reinforced cord and having an angle of 70° to 90° with respect to the peripheral direction of the tire is mounted. On the carcass 7 in the tread 5 is disposed a belt 8 which is composed of two reinforcing cord layers intersecting at angles of inclination of 10° to 30° with respect to the peripheral direction of the tire. Indicated by 9 are bead fillers, by 10 rim cushion rubbers, and by 11 are inner liners.

In accordance with the invention, the whole layer of tire sides S ranging from the beads 2 through the side walls 3 to the shoulders 4 is formed from the rubber composition of the invention. Alternatively, as shown in FIG. 2, each tire side S may be constructed to have a double-layer structure having an external layer $S_1$ and an internal layer $S_2$, in which the external layer $S_1$ alone having a thickness of 0.3 to 1.5 mm is formed from the rubber composition of the invention. The rubber composition useful for these purposes comprises the polyorganosiloxane defined before with or without an organic rubber, and carbon black. In this connection, the ratio of the organic rubber to the polyorganosiloxane may be in the range of 95/5 to 0/100.

The organic rubbers may be those indicated hereinbefore, of which natural rubber, butadiene rubber or mixtures thereof are preferred.

If the rubber compound of the invention is used to form the external layer $S_1$ of the tire side as shown in FIG. 2, the internal layer $S_2$ is not critically limited with respect to its composition, and any known rubber compounds ordinarily used for the tire side or the rubber compounds of the invention to which waxes and/or antioxidants are added may be used.

The pneumatic tire may be fabricated under ordinary conditions except that the tire sides are formed from the rubber composition of the invention and molded and cured by the use of a vulcanizing agent.

The present invention is more particularly described by way of examples and comparative examples, which should not be construed as limitation thereof.

EXAMPLE 1 AND COMPARATIVE EXAMPLES 1–3

Starting materials of the formulations indicated in Table 1 were kneaded in a rubber mixer having a temperature-in-container of 40° C., followed by forming into a sheet by means of rolls at a surface temperature of 25° C. The sheet was charged into a mold having a size of 10×10×0.1 cm, followed by heating and compressing under conditions of 50 kg/cm$^2$, 170° C. and 10 to 15 minutes and removing from the mold.

The properties of the resulting vulcanized rubbers are shown in Table 1.

In Table 1, *1–*9 have the meanings as described below.

*1: Polydiorganosiloxane having a degree of polymerization of 6000, 30 mole % of phenyl group (having Small's molecular attraction constant of 735), 0.5 mole % of vinyl group and the balance of methyl group (having Small's molecular attraction constant of 214).

*2: Polydiorganosiloxane having a degree of polymerization of 6000, 0.2 mole % of vinyl group and the balance of methyl group.

*3: SAF, made by Tokai Carbon Co., Ltd. Seast S (average particle size, about 150 angstrom).

*4: Aerosil 200, made by Japan Aerosil Co., Ltd.

*5: Dilution of 2,5-dimethyl-2,5-di-t-butyl peroxyhexane with polydimethylsiloxane. The content of the organic peroxide is 50%.

*6: Results of the measurement after subjecting a vulcanizate to ultrasonic stimulation for 2 hours.

*7: Tensile speed of 300 mm/min (DIN No. 3).

*8: Variation rate (%) obtained by measurement under the same conditions as in *7 after treatment with hot water in an autoclave at 180° C. for 15 hours.

*9: Variation rate (%) obtained by measurement under the same conditions as in *7 after heating in an oven at 160° C. for 96 hours.

TABLE 1

|  | Example | Comparative Example | | |
|---|---|---|---|---|
|  | 1 | 1 | 2 | 3 |
| Formulation (parts by weight): | | | | |
| polyorganosiloxane-1 *1 | 100 |  | 100 |  |
| polyorganosiloxane-2 *2 |  | 100 |  | 100 |
| carbon black *3 | 40 | 40 |  |  |
| white carbon *4 |  |  | 28 | 28 |
| hexamethyldisilazane |  |  | 3 | 3 |
| diethylene glycol | 2 | 2 |  |  |

TABLE 1-continued

|  | Example | Comparative Example | | |
|---|---|---|---|---|
|  | 1 | 1 | 2 | 3 |
| activated zinc oxide | 3 | 3 | 3 | 3 |
| organic peroxide *5 | 3 | 3 | 3 | 3 |
| Characteristics: | | | | |
| bleeding of carbon black *6 | no | yes | — | — |
| hardness (JIS K 6301 Type A) | 54 | 68 | 54 | 52 |
| breaking strength (kg/cm²) *7 | 102 | 9 | 98 | 97 |
| elongation at breakage (%) *7 | 570 | 35 | 460 | 440 |
| hot water resistance *8 | | | | |
| variation of breaking strength | −6 | — | −32 | −35 |
| variation of elongation at breakage | −9 | — | −56 | −61 |
| heat resistance *9 | | | | |
| variation of breaking strength | −2 | — | −12 | 0 |
| variation of elongation at breakage | −3 | — | −15 | −2 |

As will be seen from Table 1, the vulcanizate of Example 1 involves no bleeding of carbon black and good workability since the polyorganosiloxane used has 30 mole %, based on the total substituents, of phenyl group having Small's molecular attraction constant of 735. In addition, since silica is not used as the reinforcing agent, the hot water resistance is improved with very high strength by the reinforcing effect of carbon black. Furthermore, carbon black prevents the lowering of heat resistance based on the excessive introduction of phenyl group.

Comparative Example 1 uses the polyorganosiloxane having no substituents whose Small's molecular attraction constant is not smaller than 350, so that the reinforcing effect of carbon black cannot be obtained, i.e. the breaking characteristics are very poor and carbon black bleeds out with poor workability.

In Comparative Example 2, silica is used for reinforcement instead of carbon black in Example 1. The hot water resistance is poor due to silica reinforcement and the heat resistance is poor by the influence of excessive phenyl group of the polyorganosiloxane used.

Comparative Example 3 uses an ordinary VMQ silica-reinforced rubber composition and thus the hot water resistance is poor because of the silica reinforcement.

EXAMPLES 2, 3 AND COMPARATIVE EXAMPLES 4-6

EPDM was used as an organic rubber and starting materials of the formulations indicated in Table 2 were kneaded in a rubber mixer having a temperature-in-container of 80° C., followed by forming into a sheet by means of rolls having a surface temperature of 50° C. The sheet was charged into a mold having a size of 10×10×0.1 cm, followed by heating and compressing under conditions of 50 kg/cm², 170° C. and 10 to 15 minutes and removing from the mold.

The characteristic properties of the resulting vulcanizates are shown in Table 2.

In Table 2, *1 to *9 have the same meanings as described with regard to Table 1 and *10 and *11 should be noted as follows.

*10: JSR EP33, by Japan Synthetic Rubber Co., Ltd.
*11: Results of observation after allowing to stand for 24 hours after kneading.

TABLE 2

|  | Example | | Comparative Example | | |
|---|---|---|---|---|---|
|  | 2 | 3 | 4 | 5 | 6 |
| Formulation (parts by weight): | | | | | |
| polyorganosiloxane-1 *1 | 50 | 30 | | 50 | |
| polyorganosiloxane-2 *2 | | | 50 | | |
| EPDM *10 | 50 | 70 | 50 | 50 | 100 |
| carbon black *3 | 40 | 40 | 40 | | 40 |
| white carbon *4 | | | | 28 | |
| hexamethyldisilazane | | | | 2 | |
| diethylene glycol | 2 | 2 | 2 | 2 | 2 |
| activated zinc oxide | 3 | 3 | 3 | 3 | 3 |
| organic peroxide *5 | 3 | 3 | 3 | 3 | 3 |
| Characteristics: | | | | | |
| separation between organic rubber and silicone *11 | no | no | yes | yes | — |
| bleeding of carbon black *6 | no | no | slight | — | no |
| hardness (JIS K 6301 Type A) | 58 | 58 | 63 | 60 | 53 |
| breaking strength (kg/cm²) *7 | 135 | 142 | 75 | 119 | 153 |
| elongation at breakage (%) *7 | 520 | 600 | 380 | 630 | 650 |
| hot water resistance *8 | | | | | |
| variation of breaking strength | −4 | −5 | −13 | −43 | −3 |
| variation of elongation at breakage | −6 | −5 | −18 | −39 | −2 |
| heat resistance *9 | | | | | |
| variation of breaking strength | −0 | +1 | −2 | −10 | −32 |
| variation of elongation at breakage | −3 | −2 | −3 | −12 | −28 |

The results of Table 2 reveal that the rubber compounds of the invention using EPDM as the organic rubber are advantageous in that the heat resistance of EPDM is further improved with an improved hot water resistance of the silicone compounds. In addition, the separation between the polymers and the separation of carbon black are not recognized at all.

EXAMPLE 4 AND COMPARATIVE EXAMPLES 7-9

Natural rubber was used as the organic rubber and starting materials of the formulations indicated in Table 3 were processed in the same manner as in Examples 2 and 3, thereby obtaining vulcanizates.

The characteristic properties of the vulcanizates are shown in Table 3 below.

In Table 3, *12–*15 should be noted as follows with other notes being similar to those of Tables 1 and 2.
*12: SS-No. 1.
*13: Seast S (average particle size, about 150 angstrom), by Tokai Carbon Co., Ltd.
*14: FT carbon (average size, about 1500 angstrom).
*15: The ozone resistance was determined by a static ozone test in which a sample was stretched by 40% under conditions of 100 pphm of static ozone, 50° C. and 48 hours. The ozone resistance was evaluated by the number of cracks produced, i.e. A=a few cracks, B=a number of cracks, C=a multitude of cracks. The size of cracks is expressed as follows: 1=recognizable through a loupe of 10 magnifications, 2=visually recognizable, 3=cracks smaller than 1 mm, 4=cracks of 1-3 mm, and 5=cracks not smaller than 3 mm.

From Table 3, it will be seen that when natural rubber is used as the organic rubber, the rubber compounds of the invention can maintain the high strength of the natural rubber and are stable with good resistances to heat, hot water and ozone.

TABLE 3

|  | Example 4 | Comparative Example 7 | Comparative Example 8 | Comparative Example 9 |
|---|---|---|---|---|
| Formulation (parts by weight): | | | | |
| polyorganosiloxane-1 *1 | 50 |  | 50 |  |
| polyorganosiloxane-2 *2 |  | 50 |  |  |
| natural rubber *12 | 50 | 50 | 50 | 100 |
| carbon black-1 *13 | 40 |  |  | 40 |
| carbon black-2 *14 |  | 40 |  |  |
| white carbon *4 |  |  | 28 |  |
| hexamethyldisilazane |  |  | 2 |  |
| diethylene glycol | 2 | 2 | 2 | 2 |
| activated zinc oxide | 3 | 3 | 3 | 3 |
| organic peroxide *5 | 3 | 3 | 3 | 3 |
| Characteristics: | | | | |
| separation between organic rubber and silicone *11 | no | yes | yes | — |
| bleeding of carbon black *6 | no | yes | — | — |
| hardness (JIS K 6301 Type A) | 55 | 58 | 53 | 56 |
| breaking strength (kg/cm$^2$) *7 | 172 | 118 | 132 | 178 |
| elongation at breakage (%) *7 | 560 | 390 | 430 | 620 |
| **hot water resistance *8** | | | | |
| variation of breaking strength | −8 | −23 | −48 | −56 |
| variation of elongation at breakage | −9 | −19 | −45 | −62 |
| **heat resistance *9** | | | | |
| variation of breaking strength | −7 | −13 | −13 | −62 |
| variation of elongation at breakage | −6 | −16 | −18 | −68 |
| ozone resistance *15 | no cracks |  | A-1 | A-5 |

EXAMPLES 5, 6 AND COMPARATIVE EXAMPLES 10-12

Rubber compounds of the formulations and physical properties indicated in Table 4 were used to form bladders for vulcanization. These bladders were used to vulcanize tires by a usual manner, from which the performance of each bladder was evaluated.

In Table 4, *16 to *30 should be noted as follows.

*16: Polyorganosiloxane having a degree of polymerization of 6000 and having 30 mole % of phenyl group (Small's molecular attraction constant of 735), 4 mole % of ethylidenenorbonyl group and the balance of methyl group (Small's molecular attraction constant of 214).

*17: Polyorganosiloxane having a degree of polymerization of 6000 and having 0.2 mole % of vinyl group and the balance of methyl group.

*18: SAF, by Tokai Carbon Co., Ltd. Seast S (average particle size, about 150 angstrom).

*19: Aerosil 200, by Nippon Aerosil Co., Ltd.

*20: JSR Butyl 268.

*21: Neoprene W, by Showa Neoprene Co., Ltd.

*22: Alkylphenol/formaldehyde resin, by Sumitomo Chem. Ind. Co., Ltd.

*23: Aromax 1000, made by Fuji Kosan Co., Ltd.

*24: Tensile speed of 300 mm/minute (DIN No. 3), unit by kg/cm$^2$.

*25: Tensile speed of 300 mm/minute (DIN No. 3), unit by %.

*26: Type A (JIS K 6301).

*27: Variation rate (%) determined by treating with hot water in an autoclave at 180° C. for 15 hours and measuring under the same conditions as in *24.

*28: Variation rate (%) determined by heating in an oven at 160° C. for 96 hours and measuring under the same conditions as in *24.

*29: Whether or not a tire can be released without use of a releasing agent after having been molded and vulcanized. Indicated as "o" if the tire is released and as "x" if the tire is not released.

*30: Comparison with Comparative Example 12. Indicated as "o" if the durability is better than the case of Comparative Example 12 and as "x" if poorer.

TABLE 4

|  | Example 5 | Example 6 | Comparative Example 10 | Comparative Example 11 | Comparative Example 12 |
|---|---|---|---|---|---|
| Formulation (parts by weight): | | | | | |
| polyorganosiloxane-1 *16 | 100 | 30 |  | 100 |  |
| polyorganosiloxane-2 *17 |  |  | 30 |  |  |
| carbon black *18 | 40 | 40 | 40 |  | 40 |
| white carbon *19 |  |  |  | 28 |  |
| butyl rubber *20 |  | 70 | 70 |  | 100 |
| chloroprene rubber *21 | 5 | 5 | 5 | 5 | 5 |
| zinc oxide | 5 | 5 | 5 | 5 | 5 |
| stearic acid | 3 | 3 | 3 | 3 | 3 |
| hexamethyldisilazane |  |  |  | 3 |  |
| Iackiroll 20 *22 | 5 | 5 | 5 | 5 | 5 |
| Aroma oil *23 | 5 | 5 | 5 | 5 | 5 |
| diethylene glycol | 3 | 3 | 3 |  | 3 |
| Physical Properties: | | | | | |
| Initial properties | | | | | |
| tensile strength (Tb) *24 | 90.1 | 119.8 | 87.5 | 87.6 | 138.2 |
| elongation (Eb) *25 | 660 | 750 | 560 | 630 | 800 |
| hardness (Hd) *26 | 52 | 53 | 51 | 49 | 52 |
| **hot water resistance *27** | | | | | |
| variation rate of Tb | −8 | −4 | −19 | −46 | −7 |
| variation rate of Eb | −7 | −2 | −24 | −41 | −9 |
| **heat resistance *28** | | | | | |
| variation rate of Tb | −3 | −4 | −18 | −13 | −43 |
| variation rate of Eb | −2 | −3 | −25 | −15 | −38 |
| Performances: | | | | | |
| releasability *29 | o | o | o | o | x |
| durability *30 | o | o | x | x | — |

As will be seen from Table 4, tires can be more efficiently made when using the rubber compounds of the present invention.

EXAMPLE 7 AND COMPARATIVE EXAMPLES 13, 14

Compounding ingredients indicated in Table 5 were kneaded in a B-type Banbury mixer having a capacity of 1.7 liters and the resulting rubber compounds were, respectively, pressed for vulcanization at 160° C. for 20 minutes to obtain samples. The samples were subjected to a tensile test, a static ozone test and adhesiveness to rubber.

The results are shown in Table 5.

The tests used were made as follows.

The tensile test was effected at a tensile speed of 300 mm/minute at DIN No. 3 and the hardness was measured according to Type A (JIS K 6301). The heat resistance was expressed by variation rates of tensile strength (Tb) (kg/cm$^2$) and elongation (Eb) (%) after heating in an oven at 160° C. for 96 hours.

The ozone cracking was determined by a static ozone test in which a sample was stretched by 40% under conditions of 100 pphm of static ozone×50° C.×48 hours. The ozone resistance was evaluated by the number of cracks produced, i.e. A=a few cracks, B=a number of cracks, C=a multitude of cracks. The size of cracks is expressed as follows: 1=recognizable through a loupe of 10 magnifications, 2=visually recognizable, 3=cracks smaller than 1 mm, 4=cracks of 1-3 mm, and 5=cracks not smaller than 3 mm.

The adhesiveness to rubber was evaluated as an adhesiveness to rubber compound b of Table 6, and indicated as "o" if adhesion is good and as "x" if adhesion is poor. The separation between organic rubbers and silicones was visually observed after kneading in a mixer and allowing to stand for 24 hours.

TABLE 5

|  | Example 7 | Comparative Example 13 | Comparative Example 14 |
|---|---|---|---|
| Formulation (parts by weight): |  |  |  |
| polyorganosiloxane-1 *31 | 30 |  | 30 |
| polyorganosiloxane-2 *32 |  | 30 |  |
| natural rubber *33 | 35 | 35 | 35 |
| polybutadiene *34 | 35 | 35 | 35 |
| carbon black *35 | 50 | 50 |  |
| white carbon *36 |  |  | 32 |
| stearic acid | 3 | 3 | 3 |
| zinc white | 5 | 5 | 5 |
| magnesia | 5 | 5 | 5 |
| aroma oil *37 | 10 | 10 | 10 |
| sulfur | 2.5 | 2.5 | 2.5 |
| promotor-1 *38 | 0.8 | 0.8 | 0.8 |
| promotor-2 *39 | 0.8 | 0.8 | 0.8 |
| promotor-3 *40 | 0.8 | 0.8 | 0.8 |
| Physical Properties: |  |  |  |
| Initial properties |  |  |  |
| tensile strength (Tb) | 158 | 85 | 109 |
| elongation (Eb) | 630 | 350 | 480 |
| hardness (Hd) | 57 | 56 | 56 |
| heat resistance |  |  |  |
| variation rate of Tb | −8 | −30 | −21 |
| variation rate of Eb | −6 | −38 | −25 |
| ozone cracking | no crack | A-2 | A-3 |
| adhesiveness to rubber | o | x | x |
| separation between organic rubber and silicone rubber | no | yes | slight |

*31 to *40 in Table 50 should be noted as follows.

*31: Polyorganosiloxane having a degree of polymerization of 6000 and having 30 mole % of phenyl group (Small's molecular attraction constant of 735), 4 mole % of ethylidenenorbonyl group and the balance of methyl group (Small's molecular attraction constant of 214).

*32: Polyorganosiloxane having a degree of polymerization of 6000 and having 0.2 mole % of vinyl group and the balance of methyl group.

*33: RSS No. 1.

*34: BR 01, by Japan Synthetic Rubber Co., Ltd.

*35: SAF, by Tokai Carbon Co., Ltd. Seast S (average particle size of about 150 angstrom).

*36: Aerosil R-972, made by Japan Aerosil, Co., Ltd.

*37: Aromax 1000, by Fuji Kosan Co., Ltd.

*38: Nocceller MSA, by Ohuchi Shinko Chemical Co., Ltd.

*39: Nocceller DM, by Ohuchi Shinko Chemical Co., Ltd.

*40: Nocceller TT, by Ohuchi Shinko Chemical Co., Ltd.

The results of Table 5 reveal that the rubber compound of Example 7 contains the organic rubber and polyorganosiloxane of the invention at a ratio by weight of 70:30 and carbon black, so that the two rubbers do not separate from each other and the rubber compound had good resistance to ozone and heat with no problem with respect to the adhesiveness to another rubber.

In contrast, the polyorganosiloxane used in Comparative Example 13 has not substituent whose Small's molecular attraction constant is over 350, so that carbon black has little affinity for the polyorganosiloxane. Accordingly, the organic rubber separates from the polyorganosiloxane with poor storage stability. The adhesiveness to the rubber is poor and the initial physical properties and ozone and heat resistances are not good.

In Comparative Example 14, white carbon is used as the reinforcing agent, so that the ozone resistance becomes poor and the adhesiveness to the rubber is also poor.

EXAMPLE 8

A rubber compound of the formulation used in Example 7 was used to form a tire side S, followed by making a tire of such a construction as shown in FIG. 1. The tire side S had a thickness of 3.5 mm and a tire size was 165 SR 13.

The appearance and ozone cracking of the tire sides of the tire were checked with the results shown in Table 7.

The appearance of the tire sides was determined by observing gloss of the tire 6 months after the manufacture. The ozone cracking was determined by subjecting a tire under a pneumatic pressure of 2 kg/cm$^2$ to a static ozone test in the same manner as in Example 7 and evaluated according to the same evaluation standard.

EXAMPLE 9

The external layer $S_1$ of the tire side was formed from a rubber compound of the formulation used in Example 7 and the internal layer $S_2$ was formed from rubber compound b of Table 6, thereby fabricating a tire whose tire sides had a double-layer structure as shown in FIG. 2. The external layer $S_1$ of each tire side had a thickness of 1 mm and the internal layer had a thickness of 2.5 mm with a tire size of 165 SR 13.

The appearance and ozone cracking of the tire sides of the resulting tire were checked with the results shown in Table 7.

COMPARATIVE EXAMPLE 15

Rubber compound a of Table 6, which is a known rubber compound for side walls and is mainly made of a diene rubber with an antioxidant and a wax in order to impart an ozone resistance, was used to form tire sides in the same manner as in Example 8. The appearance and ozone cracking of the tire sides were checked with the results shown in Table 7.

In Table 6, *41 to *49 should be noted as follows.

*41: RSS No. 1.

*42: BR 01, by Japan Synthetic Rubber Co., Ltd.

*43: ISAF, by Tokai Carbon Co., Ltd.

*44: Paraffin wax.

*45: Nocrac 810NA, by Ohuchi Shinko Co., Ltd.

*46: Aromax 1000, by Fuji Kosan Co., Ltd.

*47: Nocceller MSA-G, by Ohuchi Shinko Co., Ltd.

*48: Nocceller DM< by Ohuchi Shinko Co., Ltd.

Physical properties were measured or determined in the same manner as in Table 5.

TABLE 6

|  | a | b |
|---|---|---|
| Formulation (parts by weight): |  |  |
| natural rubber *41 | 50 | 50 |

TABLE 6-continued

|  | a | b |
|---|---|---|
| polybutadiene rubber *42 | 50 | 50 |
| carbon black *43 | 55 | 55 |
| zinc white | 5 | 5 |
| stearic acid | 3 | 3 |
| wax *44 | 3 |  |
| antioxidant *45 | 5 | 5 |
| aroma oil *46 | 10 | 10 |
| sulfur | 1.8 | 1.8 |
| promotor-1 *47 | 0.8 | 0.8 |
| promotor-2 *48 | 0.8 | 0.8 |
| Physical Properties: | | |
| Initial properties | | |
| tensile strength (Tb) | 160 | 161 |
| elongation (Eb) | 620 | 610 |
| hardness (Hd) | 55 | 55 |
| ozone cracking | B-3 | C-3 |
| heat resistance | | |
| variation rate of Tb | −48 | −52 |
| variation rate of Eb | −52 | −55 |

TABLE 7

| Performance | Example 8 | Example 9 | Comparative Example 15 |
|---|---|---|---|
| appearance of tire side | good | good *I | bad *II |
| ozone cracking | no cracking |  | A-1 |

*I: High surface gloss without any bloomed substances.
*II: Bloomed substance (mainly composed of the wax and antioxidant) with a dull surface gloss.

The results of Table 7 reveal that a clear difference appears 6 months after the manufacture of the tires with respect to the appearance of the tire side. The tires of the invention have high gloss and are found to be apparently superior to the prior tire.

From the static ozone test of the wheel tire, it will be seen that the tires of the invention have a very good ozone resistance and have a certain range of tensile strength at the external sides thereof, thus being useful in practical service with respect to the defect proofing on the outer surfaces thereof.

EXAMPLE 10

Polydiorganosiloxane-3 which contains 2-phenylpropyl groups bonded to silicon atoms was used instead of polydiorganosiloxane-1 in Examples 2 and 3. Starting materials of the formulations indicated in Table 8 were used, and the same experiments as Examples 2 and 3 were examined. The characteristic properties of the resulting vulcanizates are shown in Table 8.

In Table 8, *3 and *6~*11 have the same meanings as described with Table 1 and Table 2, and *49 and *50 should be noted as follows.

*49: Polydiorganosiloxane having a degree of polymerization of 3500, 16 mole % of 2-phenylpropyl group (Small's molecular attraction constant of 1110), 0.5 mole % of vinyl group and the balance of methyl group.

*50: Dicumyl peroxide absorbed on calcium carbonate. The content of the organic peroxide is 40%.

TABLE 8

|  | Example 10 |
|---|---|
| Formulation (parts by weight): | |
| polyorganosiloxane-3 *49 | 30 |
| EPDM *10 | 70 |
| carbon black *3 | 40 |

TABLE 8-continued

|  | Example 10 |
|---|---|
| diethylene glycol | 2 |
| activated zinc oxide | 3 |
| organic peroxide *50 | 4 |
| Characteristics: | |
| separation between organic rubber and silicone *11 | none |
| bleeding of carbon black *6 | none |
| hardness (JIS K 6301 Type A) | 56 |
| breaking strength (kg/cm$^2$) *7 | 131 |
| elongation at breakage (%) *7 | 520 |
| **hot water resistance *8** | |
| variation of breaking strength | −6 |
| variation of elongation at breakage | −6 |
| **heat resistance *9** | |
| variation of breaking strength | −1 |
| variation of elongation at breakage | −4 |

What is claimed is:

1. A rubber compound comprising
100 parts by weight of a polyorganosiloxane of the following general formula wherein R and R' are independently selected from the group consisting of an aromatic ring substituent, an alkyl substituent, and a halogenated alkyl substituent; n is an integer of not smaller than 3; and wherein at least 6 mole percent of said substituents are an aromatic ring substituent having a Small's molecular attraction constant of not smaller than 700; and 2 to 200 parts by weight of carbon black having an average particle size not larger than 1000 angstroms.

2. A rubber compound according to claim 1, wherein 10 to 70 mole percent of said substituents have a Small's molecular attraction constant of not smaller than 700.

3. A rubber compound according to claim 2, wherein 20 to 50 mole percent of said substituents have a Small's molecular attraction constant of not smaller than 700.

4. A rubber compound according to claim 1, wherein said aromatic substituent contains a benzene ring.

5. A rubber compound according to claim 1, wherein R and R' are independently selected from the group consisting of an aromatic ring substituent and a methyl group.

6. A rubber compound according to claim 1, wherein n is not less than 15 to less than 3000 when said polyorganosiloxane is used as a liquid rubber compound.

7. A rubber compound according to claim 1, wherein n is not less than 3000 when said polyorganosiloxane is used as a millable silicone compound.

8. A rubber compound according to claim 1, wherein said polyorganosiloxane has a substantially linear structure.

9. A rubber compound according to claim 1, wherein said compound is cured and crosslinked by the action of a vulcanizing agent.

10. A rubber compound comprising 100 parts by weight of a mixture of (1) a polyorganoxiloxane of the following general formula wherein R and R' are independently selected from the group consisting of an aromatic ring substituent, an alkyl substituent, and a halogenated alkyl substituent; n is an integer of not smaller than 3; and wherein at least 6 mole percent of said substituents are an aromatic ring substituent having a Small's molecular attraction constant smaller than 700; and (2) at least one organic rubber selected from the group consisting of natural rubber, isoprene rubber, styrene-butadiene rubber, butadiene rubber, ethylen-alpha-olefin rubbers, acrylonitrile-butadiene rubber, butyl rubber, halogenated butyl rubber, fluoro rubbers, acryl rubber, epichlorohydrin rubber, ethylene-vinyl acetate copolymers and ethylene-acrylate rubber, said polyorganosiloxane and said organic rubber being mixed in a ratio of from 95:5 to 5:95 by weight; and 2 to 200 parts by weight of carbon black having an average particle size not larger than 1000 angstroms.

11. A rubber compound according to claim 10, wherein said organic rubber has a Mooney viscosity of from 20 to 150.

12. A rubber compound according to claim 10, wherein said polyorganosiloxane and said organic rubber are mixed in a ratio of from 50:50 to 30:70 by weight whereby hot water resistance is improved.

13. A rubber compound according to claim 10, wherein said rubber compound is cured and crosslinked by the action of a vulcanizing agent.

14. A rubber compound according to claim 10, wherein said polyorganosiloxane and said organic rubber are mixed in a ratio of 80:20 to 20:80 by weight.

15. A rubber compound according to claim 6, wherein n is over 100 and less than 2000.

16. A rubber compound according to claim 7, wherein n is from 4000 to 10,000.

17. A rubber compound according to claim 11, wherein said organic rubber has a Mooney viscosity of from 40 to 80.

18. A rubber compound according to claim 1, wherein said carbon black is in the amount of 20 to 100 parts by weight.

19. A rubber compound according to claim 1, wherein said carbon black has an average particle size of not larger than 600 angstroms.

20. A rubber compound according to claim 1, wherein said aromatic ring substituent is selected from the group consisting of phenyl, m-methylphenyl, p-methylphenyl, p-ethylphenyl, p-isopropylphenyl, m-sec-butylphenyl, m-tert-butylphenyl, p-sec-butylphenyl, p-tert-butylphenyl, m-phenylphenyl, p-phenylphenyl, p-benzylphenyl, beta-naphthyl, alpha-naphthyl, 2,4-dimethylphenyl, 2,5-dimethylphenyl, 3,4-dimethylphenyl, 3,5-dimethylphenyl, o-methoxyphenyl, m-methoxyphenyl, p-methoxyphenyl, m-phenoxyphenyl, p-phenoxyphenyl, 4-methoxy-3-methylphenyl, 6-methoxy-3-methylphenyl, 3,4-dimethoxyphenyl, 2-methyl-4-methoxy-5-isopropylphenyl, phenoxymethyl, o-fluorophenol, m-fluorophenyl, p-fluorophenyl, o-chlorophenyl, p-chlorophenyl, 2,3-dichlorophenyl, 2,4-dichlorophenyl, 2,5-dichlorophenyl, 2,6-dichlorophenyl, 3,4-dichlorophenyl, 3,5-dichlorophenyl, 2,3,4-trichlorophenyl, 2,3,5-trichlorophenyl, 2,3,6-trichlorophenyl, 2,4,5-trichlorophenyl, 2,3,4,5-tetrachlorophenyl, 2,3,4,6-tetrachlorophenyl, 2,3,5,6-tetrachlorophenyl, pentachlorophenyl, o-bromophenyl, m-bromophenyl, p-bromophenyl, p-cyanophenyl, p-aminophenyl, p-hydroxyphenyl, m-cyanophenyl, m-aminophenyl, 2-phenylethyl, and 2-phenylpropyl.

21. A rubber compound according to claim 1, comprising:

100 parts by weight of a polyorganoxiloxane of the following general formula wherein R and R' are independently selected from the group consisting of a phenyl substituent and a methyl substituent; n is an integer from 4000 to 10,000; and wherein said phenyl substituent is in the amount of from 20 to 50 mole % of said substituents, said phenyl substituent having a Small's molecular attraction constant of not smaller than 700; and 20 to 100 parts by weight of carbon black having an average particle size of not larger than 600 angstroms.

* * * * *